(12) United States Patent　　(10) Patent No.: US 10,568,098 B2
Takahashi et al.　　(45) Date of Patent: Feb. 18, 2020

(54) BASE STATION AND REPORTING METHOD

(71) Applicant: NTT DOCOMO, INC., Tokyo (JP)

(72) Inventors: Hideaki Takahashi, Tokyo (JP); Tooru Uchino, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/761,980

(22) PCT Filed: Sep. 20, 2016

(86) PCT No.: PCT/JP2016/077723
§ 371 (c)(1),
(2) Date: Mar. 21, 2018

(87) PCT Pub. No.: WO2017/051807
PCT Pub. Date: Mar. 30, 2017

(65) Prior Publication Data
US 2018/0279309 A1　　Sep. 27, 2018

(30) Foreign Application Priority Data
Sep. 24, 2015　(JP) .................................. 2015-187497

(51) Int. Cl.
*H04W 72/04* (2009.01)
*H04W 92/20* (2009.01)

(52) U.S. Cl.
CPC ....... *H04W 72/0453* (2013.01); *H04W 92/20* (2013.01)

(58) Field of Classification Search
None
See application file for complete search history.

(56) References Cited

U.S. PATENT DOCUMENTS

2015/0117287 A1* 4/2015 Kim .................. H04W 52/0216
　　　　　　　　　　　　　　　　　　370/311
2017/0245264 A1* 8/2017 Suzuki ................... H04W 8/22

OTHER PUBLICATIONS

3GPP TS 36.331 V12.6.0; "3rd Generation Partnership Project; Technical Specification Group Radio Access Network; Evolved Universal Terrestrial Radio Access (E-UTRA); Radio Resource Control (RRC); Protocol specification (Release 12)"; Jun. 2015 (448 pages).

(Continued)

*Primary Examiner* — Diane L Lo
(74) *Attorney, Agent, or Firm* — Osha Liang LLP

(57) ABSTRACT

A base station of a radio communication system supporting carrier aggregation is provided. The base station includes a receiver configured to receive, from a user apparatus, first band combination information that indicates combinations of bands supported by the user apparatus through the carrier aggregation, the first band combination information being generated in a first format; a generator configured to generate, based on the combinations of bands indicated by the first band combination information, second band combination information using a second format; and a transmitter configured to transmit, to another base station or a switching apparatus, the second band combination information generated by the generation unit.

5 Claims, 17 Drawing Sheets

(56) References Cited

OTHER PUBLICATIONS

3GPP TS 36.101 V13.0.0; "3rd Generation Partnership Project; Technical Specification Group Radio Access Network; Evolved Universal Terrestrial Radio Access (E-UTRA); User Equipment (UE) radio transmission and reception (Release 13)"; Jul. 2015 (699 pages).
3GPP TS 36.306 V12.5.0; "3rd Generation Partnership Project; Technical Specification Group Radio Access Network; Evolved Universal Terrestrial Radio Access (E-UTRA); User Equipment (UE) radio access capabilities (Release 12)"; Jun. 2015 (44 pages).
International Search Report of the International Searching Authority issued in PCT/JP2016/077723 dated Dec. 6, 2016 (5 pages).
Witten Opinion of the International Searching Authority issued in PCT/JP2016/077723 dated Dec. 6, 2016 (3 pages).
Extended European Search Report issued in the counterpart European Patent Application No. 16848595.1, dated Feb. 1, 2019 (11 pages).
RAN2 Chairman (Ericsson); "Chairman Notes"; 3GPP TSG RAN WG2 #91; Beijing, China, Aug. 24-28, 2015 (79 pages).
NTT Docomo, Inc.; "Solution to reduce CA capability signalling size for B5C"; 3GPP TSG-RAN WG2 #91 R2-153102; Beijing, P.R. China, Aug. 24-28, 2015 (8 pages).
Huawei; "eCA Capability backward compatibility"; 3GPP TSG-RAN WG2 Meeting #93bis R2-162279; Dubrovnik, Croatia, Apr. 11-15, 2016 (4 pages).
Nokia Networks (Rapporteur); "Report of email discussion [91#21][LTE/CAe] Capability signalling enhancements"; 3GPP TSG-RAN WG2 Meeting #91bis R2-154249; Malmö, Sweden, Oct. 5-9, 2015 (27 pages).

* cited by examiner

FIG.3A

| PARAMETERS FOR EACH CA BAND COMBINATION |
|---|
| supprtedBandWidthCombinationSet |
| multipleTimingAdvance |
| simultaneousRx-Tx |
| dc-Support |
| supportedNAICS-2CRS-AP |
| commSupportedBandsPerBC |

FIG.3B

| PARAMETERS FOR EACH BAND IN CA BAND COMBINATION |
|---|
| bandEUTRA |
| interFreqNeedForGaps |
| supportedCSI-Proc |
| Ca-BandWidthClass (UL/DL) |
| supportedMIMO-Capability (UL/DL) |

FIG.4

| Table 5.6A-1: CA bandwidth classes and corresponding nominal guard bands (TS36.101) | | |
|---|---|---|
| CA Bandwidth Class | Aggregated Transmission Bandwidth Configuration | Number of contiguous CC | Nominal Guard Band $BW_{GB}$ |
| A | $N_{RB,\,agg} \leq 100$ | 1 | $a_1\,BW_{Channel(1)} - 0.5\,\Delta f_1$ (NOTE 2) |
| B | $25 < N_{RB,\,agg} \leq 100$ | 2 | $0.05\,max\,(BW_{Channel(1)},\,BW_{Channel(2)}) - 0.5\,\Delta f_1$ |
| C | $100 < N_{RB,\,agg} \leq 200$ | 2 | $0.05\,max\,(BW_{Channel(1)},\,BW_{Channel(2)}) - 0.5\,\Delta f_1$ |
| D | $200 < N_{RB,\,agg} \leq 300$ | 3 | $0.05\,max\,(BW_{Channel(1)},\,BW_{Channel(2)},\,BW_{Channel(3)}) - 0.5\,\Delta f_1$ |
| E | $300 < N_{RB,\,agg} \leq 400$ | 4 | NOTE 3 |
| F | $400 < N_{RB,\,agg} \leq 500$ | 5 | NOTE 3 |

NOTE 1: $BW_{Channel(j)}$, $j = 1, 2, 3$, is the channel bandwidth of an E-UTRA component carrier according to Table 5.6-1 and $\Delta f_1 = \Delta f$ for the downlink with $\Delta f$ the subcarrier spacing while $\Delta f_1 = 0$ for the uplink.

NOTE 2: $a_1 = 0.16/1.4$ for $BW_{Channel(1)} = 1.4$ MHz whereas $a_1 = 0.05$ for all other channel bandwidths.

NOTE 3: Applicable for later releases.

FIG.6

| CA Bandwidth Class combinations ||||||
| CA band comb. | No. | direction | frequency band |||
| | | | 800 M (19A) | 1.5 G (21A) | 2 G (1A) |
| --- | --- | --- | --- | --- | --- |
| 3DL/3UL | 1 | UL | A | A | A |
| | | DL | A | A | A |
| 3DL/2UL | 2 | UL | A | A | |
| | | DL | A | A | A |
| | 3 | UL | | A | A |
| | | DL | A | A | A |
| | 4 | UL | A | | A |
| | | DL | A | A | A |
| 3DL/1UL | 5 | UL | A | | |
| | | DL | A | A | A |
| | 6 | UL | | A | |
| | | DL | A | A | A |
| | 7 | UL | | | A |
| | | DL | A | A | A |
| 2DL/2UL | 8 | UL | A | A | |
| | | DL | A | A | |
| | 9 | UL | | A | A |
| | | DL | | A | A |
| | 10 | UL | A | | A |
| | | DL | A | | A |
| 2DL/1UL | 11 | UL | A | | |
| | | DL | A | A | |
| | 12 | UL | | A | |
| | | DL | A | A | |
| | 13 | UL | | A | |
| | | DL | | A | A |
| | 14 | UL | | | A |
| | | DL | | A | A |
| | 15 | UL | A | | |
| | | DL | A | | A |
| | 16 | UL | | | A |
| | | DL | A | | A |
| Non-CA | 17 | UL | A | | |
| | | DL | A | | |
| | 18 | UL | | A | |
| | | DL | | A | |
| | 19 | UL | | | A |
| | | DL | | | A |

FALLBACK BAND COMBINATIONS (rows 2–19)

FIG.7

| CA band comb. | No. | direction | MIMO capability (THE NUMBER OF LAYERS SUPPORTED) |||
|---|---|---|---|---|---|
| | | | frequency band |||
| | | | 800 M (19A) | 1.5 G (21A) | 2 G (1A) |
| 3DL/3UL | 1 | UL | 2 | 2 | 2 |
| | | DL | 2 | 2 | 2 |
| 2DL/2UL | 2 | UL | 2 | 2 | |
| | | DL | 2 | 2 | |
| | 3 | UL | | 2 | 2 |
| | | DL | | 2 | 2 |
| | 4 | UL | 2 | | 2 |
| | | DL | 2 | | 2 |
| ... | | | | | |

FIG.8

```
                    UE-EUTRA-Capability information element

-- ASN1START

UE-EUTRA-Capability ::=         SEQUENCE {
<< skip unchanged part >>
    nonCriticalExtension            UE-EUTRA-Capability-v920-IEs        OPTIONAL
}
<< skip unchanged part >>
UE-EUTRA-Capability-v1260-IEs ::=   SEQUENCE {
<< skip unchanged part >>
    nonCriticalExtension            UE-EUTRA-Capability-v13xy-IEs
    OPTIONAL
}

UE-EUTRA-Capability-v13xy-IEs ::=   SEQUENCE {
    rf-Parameters-v13xy             RF-Parameters-v13xy                 OPTIONAL,
    nonCriticalExtension            SEQUENCE {}                         OPTIONAL
}

RF-Parameters-v13xy ::=         SEQUENCE {
    supportedBandCombination-r13        SupportedBandCombination-r13    OPTIONAL,
}

SupportedBandCombination-r13 ::= SEQUENCE (SIZE (1..maxBandComb-r13)) OF
BandCombinationParametersParent-r13

BandCombinationParametersParent-r13 ::= SEQUENCE {
    bandParameterList-r13           SEQUENCE (SIZE (1..maxSimultaneousBands-r10)) OF
        BandParameters-r11,
    supportedBandwidthCombinationSet-r13    SupportedBandwidthCombinationSet-r10    OPTIONAL,
    multipleTimingAdvance-r13       ENUMERATED {supported}              OPTIONAL,
    simultaneousRx-Tx-r13           ENUMERATED {supported}              OPTIONAL,
    bandInfoEUTRA-r13               BandInfoEUTRA,
    dc-Support-r12                  SEQUENCE {
        asynchronous-r12                ENUMERATED {supported}          OPTIONAL,
        supportedCellGrouping-r12       CHOICE {
            threeEntries-r12                BIT STRING (SIZE(3)),
            fourEntries-r12                 BIT STRING (SIZE(7)),
            fiveEntries-r12                 BIT STRING (SIZE(15))
        }                                                               OPTIONAL
    }                                                                   OPTIONAL,
    supportedNAICS-2CRS-AP-r12      BIT STRING (SIZE (1..maxNAICS-Entries-r12))     OPTIONAL,
    commSupportedBandsPerBC-r12     BIT STRING (SIZE (1.. maxBands))                OPTIONAL,
    non-SupportedBandCombinationChild-r13   SEQUENCE (SIZE (1..maxBandComb-r13)) OF
BandCombinationParameters-r13,
    supportedBandCombinationChildExt-r13    SEQUENCE (SIZE (1..maxBandComb-r13)) OF
BandCombinationParametersChildExt-r13
}

BandCombinationParametersChildExt-r13 ::=   SEQUENCE {
    bandParameterList-r13           SEQUENCE (SIZE (1..maxSimultaneousBands-r10)) OF
        BandParameters-r11,
    supportedBandwidthCombinationSet-r13    SupportedBandwidthCombinationSet-r10    OPTIONAL,
    multipleTimingAdvance-r13       ENUMERATED {supported}              OPTIONAL,
    simultaneousRx-Tx-r13           ENUMERATED {supported}              OPTIONAL,
    bandInfoEUTRA-r13               BandInfoEUTRA,
    dc-Support-r12                  SEQUENCE {
        asynchronous-r12                ENUMERATED {supported}          OPTIONAL,
        supportedCellGrouping-r12       CHOICE {
            threeEntries-r12                BIT STRING (SIZE(3)),
            fourEntries-r12                 BIT STRING (SIZE(7)),
            fiveEntries-r12                 BIT STRING (SIZE(15))
        }                                                               OPTIONAL
    }                                                                   OPTIONAL,
    supportedNAICS-2CRS-AP-r12      BIT STRING (SIZE (1..maxNAICS-Entries-r12))     OPTIONAL,
    commSupportedBandsPerBC-r12     BIT STRING (SIZE (1.. maxBands))                OPTIONAL
}

BandParameters-r11 ::= SEQUENCE {
    bandEUTRA-r11                   FreqBandIndicator-r11,
    bandParametersUL-r11            BandParametersUL-r10                OPTIONAL,
    bandParametersDL-r11            BandParametersDL-r10                OPTIONAL,
    supportedCSI-Proc-r11           ENUMERATED {n1, n3, n4}             OPTIONAL
}

BandParameters-r13 ::= SEQUENCE {
```

FIG.9

```
    bandEUTRA-r13              FreqBandIndicator-r11,
    bandParametersUL-r13       BandParametersUL-r10                OPTIONAL,
    bandParametersDL-r13       BandParametersDL-r10                OPTIONAL
}

BandParametersUL-r10 ::= SEQUENCE (SIZE (1..maxBandwidthClass-r10)) OF CA-MIMO-ParametersUL-r10

CA-MIMO-ParametersUL-r10 ::= SEQUENCE {
    ca-BandwidthClassUL-r10       CA-BandwidthClass-r10,
    supportedMIMO-CapabilityUL-r10  MIMO-CapabilityUL-r10          OPTIONAL
}

BandParametersDL-r10 ::= SEQUENCE (SIZE (1..maxBandwidthClass-r10)) OF CA-MIMO-ParametersDL-r10

CA-MIMO-ParametersDL-r10 ::= SEQUENCE {
    ca-BandwidthClassDL-r10       CA-BandwidthClass-r10,
    supportedMIMO-CapabilityDL-r10  MIMO-CapabilityDL-r10          OPTIONAL
}

CA-BandwidthClass-r10 ::= ENUMERATED {a, b, c, d, e, f, ...}

MIMO-CapabilityUL-r10 ::= ENUMERATED {twoLayers, fourLayers}

MIMO-CapabilityDL-r10 ::= ENUMERATED {twoLayers, fourLayers, eightLayers}

BandInfoEUTRA ::=              SEQUENCE {
    interFreqBandList              InterFreqBandList,
    interRAT-BandList              InterRAT-BandList     OPTIONAL
}

InterFreqBandList ::=          SEQUENCE (SIZE (1..maxBands)) OF InterFreqBandInfo InterFreqBandInfo ::=          SEQUENCE {
    interFreqNeedForGaps           BOOLEAN
}

InterRAT-BandList ::=          SEQUENCE (SIZE (1..maxBands)) OF InterRAT-BandInfo InterRAT-BandInfo ::=          SEQUENCE {
    interRAT-NeedForGaps           BOOLEAN
}
<< skip unchanged part >>
-- ASN1STOP
```

| *UE-EUTRA-Capability* field descriptions | FDD/ TDD diff |
|---|---|
| *supportedBandCombination-r13* <br> Includes the supported parent band combinations for the UE. The parent band combination is defined as a band combination whose supported number of CCs is the maximum number for both UL and DL among all the band combinations supported by the UE. The UE shall not include fallback combinations from the parent band combination, whose supported number of CCs is less than the parent band combination in UL and DL. By default, the eNB considers all the fallback combinations including Non-CA band combinations for a parent band combination supported unless it is indicated in the *non-supportedBandCombinationChild*. | = |
| *BandCombinationParametersParent* <br> Indicates the band combination parameters for a parent band combination defined as a band combination whose supported number of CCs is the maximum number for both UL and DL among the band combinations supported by the UE. | = |
| *non-SupportedBandCombinationChild* <br> Includes the fallback band combinations of a parent band combination which are not supported by the UE. | = |
| *supportedBandCombinationChildExt* <br> Includes the fallback band combinations of a parent band combination supported by the UE whose band combination parameters are different from the parent band combination. If some fields are absent for a fallback band combination, these values are the same as the parent band combination. | = |

FIG.10

5.6.3.3 Reception of the *UECapabilityEnquiry* by the UE

The UE shall:

3> if the UECapabilityEnquiry message includes enhancedCAcapabilityRequest and the UE supports to form and include the suppotedBandCombination-r13 in UE-EUTRA-Capability:

4> if the *UECapabilityEnquiry* message includes *requestedFrequencyBands* and UE supports *requestedFrequencyBands*:

5> create a set of band combinations supported by the UE, only consisting of bands included in *requestedFrequencyBands*, and prioritized in the order of *requestedFrequencyBands*, (i.e. first include remaining band combinations containing the first-listed band, then include remaining band combinations containing the second-listed band, and so on), including non-CA combinations, target for being included in *supportedBandCombination-r13*:

- include all CA band combinations whose supported number of CCs in the maximum number for both UL and DL among all the band combinations supported by the UE.

- For each CA band combination to be included in *supportedBandCombination-r13*, if there are fallback band combinations not supported by the UE:

- include the fallback band combinations in *non-SupportedBandCombinationChild* within *supportedBandCombination-r13*;

- For each CA band combination to be included in *supportedBandCombination-r13*, if there are fallback band combinations supported by the UE, whose band combination parameters are different from the CA band combination:

- include the fallback band combinations in *supportedBandCombinationChildExt* with the different band combination parameters within *supportedBandCombination-r13*;

4> else:

5> create a set of band combinations supported by the UE, including non-CA combinations, target for being included in *supportedBandCombination-r13*:

- include all CA band combinations whose supported number of CCs in the maximum number for both UL and DL among all the band combinations supported by the UE.

- For each CA band combination to be included in *supportedBandCombination-r13*, if there are fallback band combinations not supported by the UE:

- include the fallback band combinations in *non-SupportedBandCombinationChild* within *supportedBandCombination-r13*;

- For each CA band combination to be included in *supportedBandCombination-r13*, if there are fallback band combinations supported by the UE, whose band combination parameters are different from the CA band combination:

- include the fallback band combinations in *supportedBandCombinationChildExt* with the different band combination parameters within *supportedBandCombination-r13*;

BASE STATION AND REPORTING METHOD

TECHNICAL FIELD

The present invention relates to a base station and a reporting method.

BACKGROUND ART

According to LTE-Advanced, in order to achieve a throughput greater than LTE while maintaining backward compatibility with LTE, carrier aggregation (CA: Carrier Aggregation) where communication is carried out using a plurality of carriers simultaneously, with a band width (maximum 20 MHz) supported by LTE as a basic unit, is adopted. A carrier used as the basic unit according to the carrier aggregation is called a component carrier (CC).

The carrier aggregation is classified into 3 scenarios as shown in FIGS. 1A-1C depending on a frequency arrangement for CCs. FIG. 1A shows a scenario of Intra-band contiguous CA where contiguous CCs within a band are arranged. This scenario is applied to, for example, a case where allocation is made to a wide band such as 3.5 GHz band. FIG. 1B shows Inter-band non-contiguous CA that is a scenario where a plurality of CCs of different bands are arranged. This scenario is applied to, for example, a case where communication is carried out using a plurality of carriers such as a 2 GHz band and a 1.5 GHz band. FIG. 1C shows Intra-band non-contiguous CA that is a scenario where noncontiguous CCs are arranged in the same band. This scenario is applied to, for example, a case where allocation of frequency bands to an operator is made fragmentarily.

As for an LTE (that includes LTE-Advanced) system, it is specified that, at a time of, for example, connecting to a network, a user apparatus UE reports the capability of the user apparatus UE to a base station eNB using a predetermined signaling message (UE-EUTRA-Capability) (Non-patent Reference No. 1).

PRIOR ART DOCUMENT

Non-Patent Document

Non-patent Document No. 1: 3GPP TS 36.331 V12.6.0 (2015-06)
Non-patent Document No. 2: 3GPP TS36.101 V13.0.0 (2015-07)

SUMMARY OF THE INVENTION

Problem to be Solved by the Invention

In the above-mentioned capability reporting, the user apparatus UE reports a combination of bands which the user apparatus UE supports in CA (CA band combination) to the base station eNB. 3GPP Rel. 10 specifies that, if the user apparatus UE supports a plurality of types of CA band combinations, the user apparatus UE reports patterns of all supported CA band combinations to the base station eNB.

According to a conventional technology specified in Rel. 10, a user apparatus UE itself needs to report all of the compatible CA band combinations. Therefore, the greater the number of CCs to aggregate becomes, the greater the number of CA band combinations to report becomes. According to LTE in Rel. 13, CA where up to 32 CCs are aggregated has been studied for the purpose of achieving more flexible high-speed radio communication. Accordingly, if the conventional technology is applied as it is, the number of CA band combinations to report amounts to a very great number, and the signal amount (information amount) for carrying out signaling amounts to a very great amount.

According to Rel. 13, it has been studied to specify a new format, in which, in order to solve the problem, if a user apparatus UE supports a plurality of CA band combinations, reporting information indicating some CA band combinations is omitted, whereby it is possible to reduce the signal amount. Additionally, it has been studied that a user apparatus UE reports CA band combinations according to a format specified in Rel. 13 to a base station eNB only if the user apparatus UE has received an indication from the base station eNB (for example, if it has been reported that the base station eNB supports the format specified in Rel. 13). In this case, if there is no indication, the user apparatus UE reports CA band combinations according to the format specified in Rel. 10.

At this time, the CA band combinations reported by the user apparatus UE are stored in the base station eNB and a switching apparatus MME, and, are reported (transferred) from the base station eNB, to which the user apparatus UE belongs, to a target base station eNB if handover (HO: Handover) is carried out. Further, if the user apparatus UE has entered a RRC_IDLE state, has moved to another base station eNB due to Cell reselection, and has entered a RRC CONNECTED state, the switching apparatus MME reports (transfers) the CA band combinations to the other base station eNB (i.e., the target base station eNB).

However, in a radio network, all of the base stations eNB are not necessarily compatible with Rel. 13. That is, there is a likelihood that the target base station eNB cannot interpret the format specified in Rel. 13. In this case, there is a likelihood that the target base station eNB cannot understand the CA band combinations supported by the user apparatus UE, and cannot carry out CA control.

The disclosed art has been devised in consideration of the above-mentioned points, and an object is to provide a technology making it possible to cause each base station to be aware of CA band combinations that can be supported by a user apparatus.

Means to Solve the Problem

A base station according to the disclosed art is a base station of a radio communication system supporting carrier aggregation. The base station includes a receiver configured to receive, from a user apparatus, first band combination information that indicates combinations of bands that are capable of being supported by the user apparatus through the carrier aggregation, the first band combination information being generated in a first format; a generator configured to generate, based on the combinations of bands indicated by the first band combination information, second band combination information using a second format; and a transmitter configured to transmit, to another base station or a switching apparatus, the second band combination information generated by the generator.

Advantageous Effects of the Invention

According to the disclosed art, it is possible to provide a technology making it possible to cause each base station to be aware of CA band combinations with which a user apparatus is compatible.

BRIEF DESCRIPTION OF THE DRAWINGS

FIG. 3A illustrates various parameters in CA band combinations.

FIG. 3B illustrates various parameters in CA band combinations.

FIG. 4 is a table showing a CA-BandwidthClass.

FIG. 6 shows information that is reported as CA band combination when a user apparatus UE supports up to 3DL/3UL CA.

FIG. 7 shows an example of the number of MIMO layers for each CA combination to be reported.

FIG. 8 shows one example of a format of CA band combination information (Rel. 13).

FIG. 9 shows one example of a format of CA band combination information (Rel. 13).

FIG. 10 illustrates a processing procedure to generate CA band combination information (Rel. 13).

MODES FOR CARRYING OUT THE INVENTION

Below, embodiments of the present invention are described with reference to the drawings. Note that, the embodiments described below are merely examples, and embodiments to which the present invention is applied are not limited to the embodiments described below. For example, communication systems according to the embodiments are assumed as being compatible with LTE including LTE-Advanced. However, the present invention is not limited to LTE, and may be applied to another radio system carrying out CA. Note that, in the specification and the claims, "LTE" is used to have wide meaning including not only a communication system compatible with 3GPP Release 8 or 9, but also 3GPP Release 10, 11, 12, 13, or a 5th-generation communication system corresponding to on or after 3GPP Release 14.

Additionally, in the description below, mainly a "CA band combination" or a "fallback band combination" is used to imply a combination of any bands. Mainly "information indicating a CA band combination" and "information indicating a fallback band combination", or the like, are used to imply information indicating a combination of any bands. A fallback band combination is described below. "CA band combination information" is used to imply information transmitted and received between apparatuses.

<CA Band Combination Information According to Rel. 10>

Figure 1A:
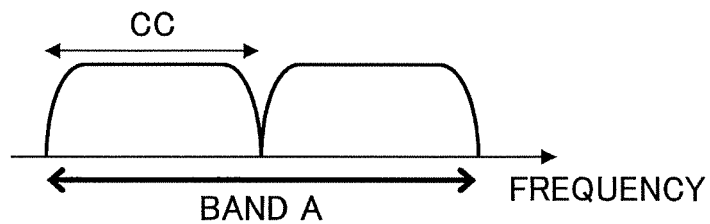
FIG. 1A shows a frequency arrangement example of carrier aggregation.
Figure 1B:
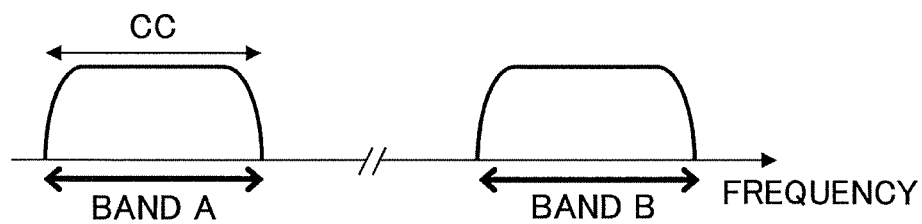
FIG. 1B shows a frequency arrangement example of carrier aggregation.
Figure 1C:
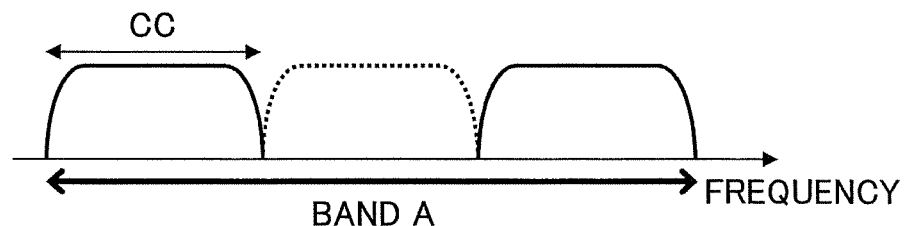
FIG. 1C shows a frequency arrangement example of carrier aggregation.
Figure 2:
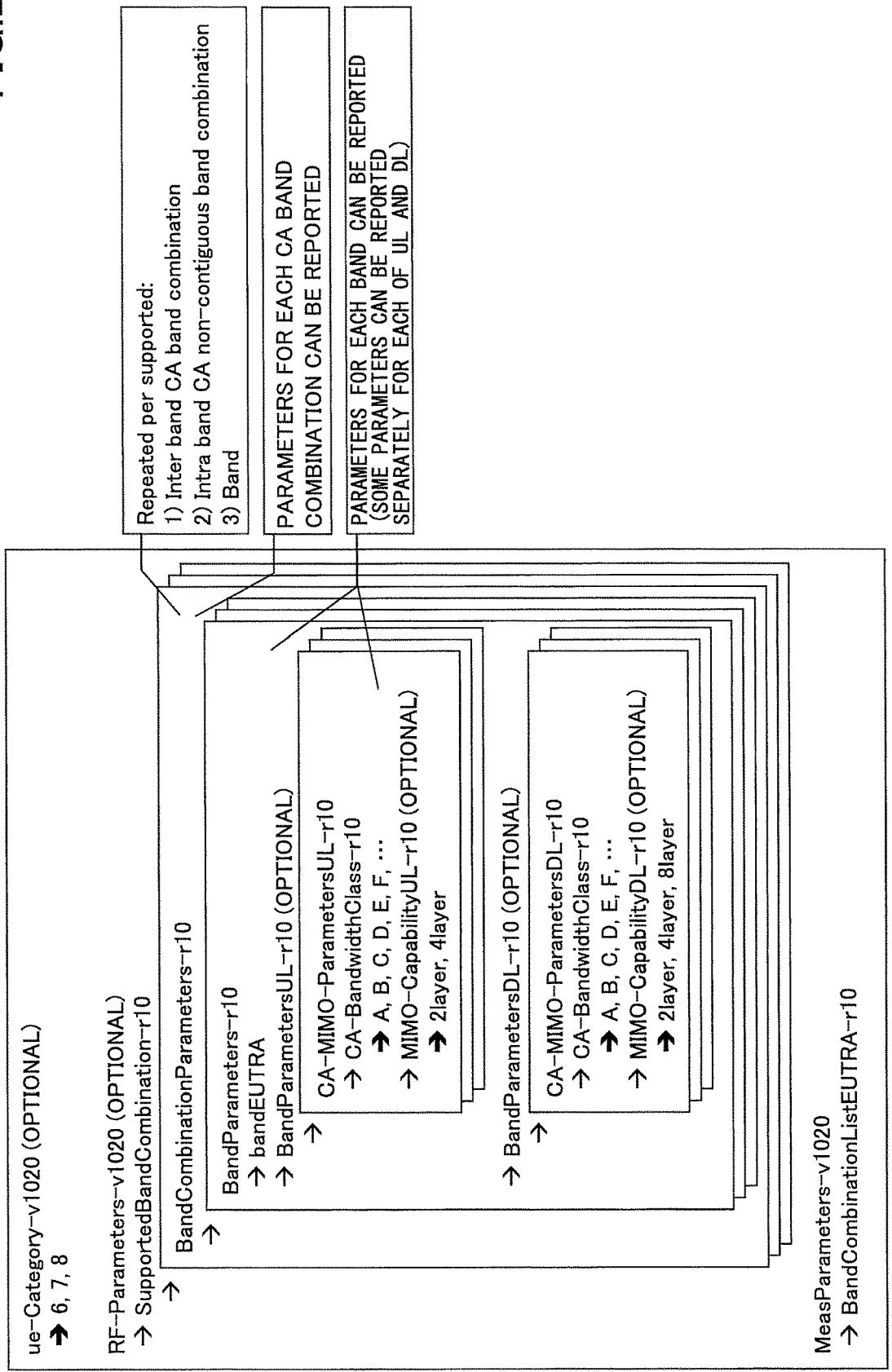
FIG. 2 illustrates a format of CA band combination information (Rel. 10).

FIG. 2 shows a format (SupportedBandCombination-r10) of CA band combination information specified in Rel. 10. As shown in FIG. 2, by using the information, various parameters can be reported separately for UL and DL for each CA band combination. Additionally, various parameters can be reported for each band in a CA band combination. FIG. 3A shows an example of parameters that can be configured for each CA band combination, and FIG. 3B shows an example of parameters that can be reported for each band in a CA band combination. For example, "dc-Support" is a parameter indicating that the user apparatus is compatible with Dual Connectibity (hereinafter, referred to as "DC"). The parameter "supportCSI-Proc" indicates the number of CSI (Channel State Information) processes that can be supported by the user apparatus. "CA bandwidthclass" is a parameter indicating a band width class (for each of UL and DL) that can be supported by the user apparatus. The parameter "supportedMIMO-Capability" indicates the number of MIMO layers (for each of UL and DL) that can be supported by the user apparatus.

The number of CSI processes is the maximum number of processes that can run when CSI is calculated in the user apparatus, and is used when CSI is reported to the base station for CoMP (Coordinated Multi-point).

A CA bandwidthclass is a class defined in a table of FIG. 4 (Non-patent Reference No. 2), and indicates the band width and the number of CCs that the user apparatus UE can aggregate, for each frequency band. For example, a standard specification prescribes 1A_21A for a case of the maximum number of CCs for each band of the frequency bands 2 GHz (Band 1) and 1.5 GHz (Band 21) being 1, the maximum aggregatable band width being 100 RB, and the scenario is inter-band CA of 2 CCs.

Figure 5A:
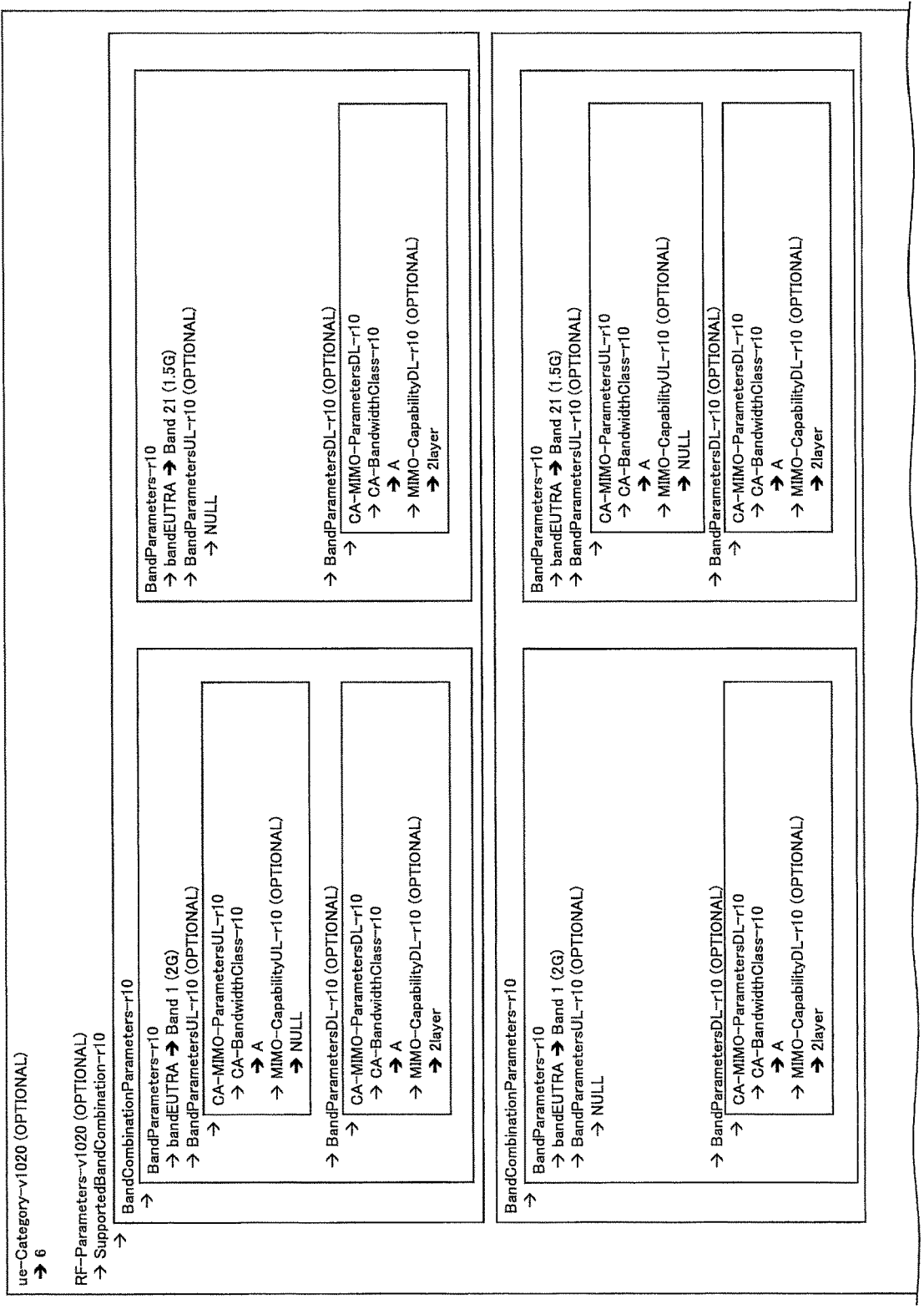
FIG. 5A shows an actual example of CA band combination information (Rel. 10).
Figure 5B:
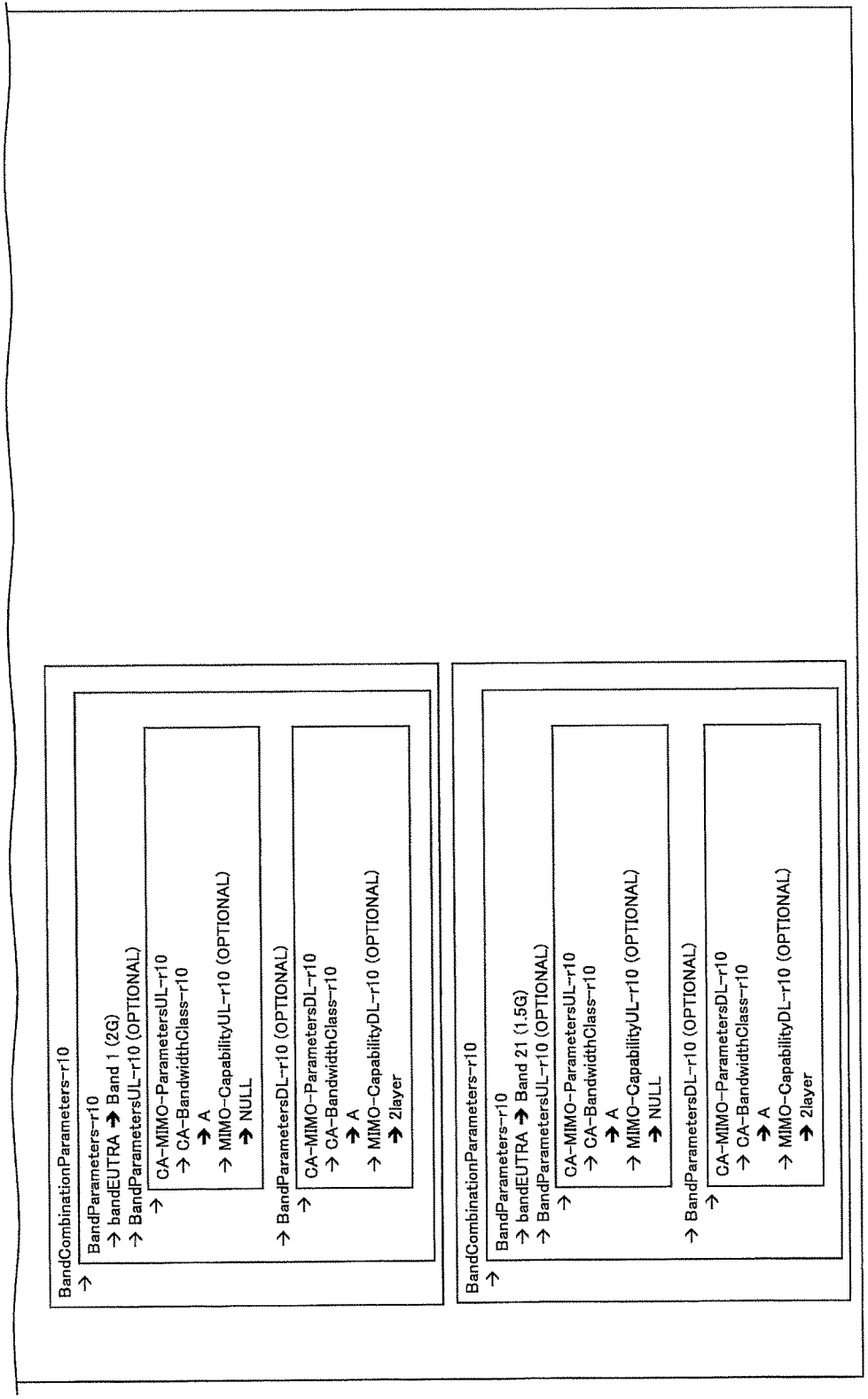
FIG. 5B shows an actual example of CA band combination information (Rel. 10).

FIGS. 5A and 5B show an actual example of CA band combination information specified in Rel. 10. The example shown in FIGS. 5A and 5B is for CA of only downlink of 2G+1.5G, and is an example of reporting a capability of carrying out downlink 2×2MIMO. According to the example shown in FIGS. 5A and 5B, information of 4 patterns is reported, from a pattern carrying out downlink CA using 2 bands through a pattern using only 1.5G.

FIG. 6 shows a CA band combination reported if the user apparatus UE supports up to 3DL/3UL CA. Note that, the four CA band combinations (BandCombinationParameters-r10) shown in FIGS. 5A and 5B correspond to "No. 13", "No. 14", "No. 18", and "No. 19" of FIG. 6 in the order from the top.

Band combinations (the number of CCs is smaller in either one or both of DL and UL) lower than the maximum CA capability 3DL/3UL are called fallback band combinations. In the example of FIG. 6, the user apparatus UE supports 3DL/3UL and all of their fallback band combinations, so that 19 CA band combinations in total are reported to the base station eNB. Note that, "A" indicated in each band in each CA band combination of FIG. 6 means the CA bandwidthclass in the band. Note that, it is specified that, even if CA is not carried out (Non-CA, Nos. 17-19), reporting is made with as a subset of CA. Additionally, as described above, in a CA band combination, various parameters can be reported. FIG. 7 shows an example of reporting parameters concerning the number of MIMO layers. FIG. 7 shows, for each band of each CA combination, the number of MIMO layers that can be supported by the user apparatus.

<CA Band Combination Information Studied in Rel. 13>

A format (SupportedBandCombination-r13) of CA band combination information studied in Rel. 13 is described.

According to Rel. 13, if a user apparatus UE supports a certain CA band combination as well as all of its fallback band combinations, the user apparatus UE omits reporting information indicating the fallback band combinations, and reports CA band combination information including only information indicating the highest CA band combination. A highest CA band combination means a CA band combination for which the number of CCs combined for both of UL and DL is greatest from among all of the CA band combinations supported by the user apparatus UE. For example, if a user apparatus UE supports all of the CA band combinations shown in FIG. 6, the CA band combination of No. 1 corresponds to a highest CA band combination.

If a base station eNB receives, from a user apparatus UE, CA band combination information including only "information indicating a highest CA band combination", the base station eNB determines that the user apparatus UE supports the received CA band combination as well as all of its fallback band combinations. Additionally, the base station eNB determines that the various parameters in each fallback band combination are the same as the various parameters in the highest CA band combination.

Note that, if a user apparatus UE supports Intra-band contiguous CA, and the user apparatus UE supports a higher-level CA bandwidthclass, the user apparatus UE is determined to support all of the lower-level CA bandwidthclasses. Specifically, if a user apparatus UE is compatible with all of the "A" through "F" CA bandwidthclasses in a certain frequency band, the user apparatus UE reports "F" as a CA bandwidthclass concerning the certain band in a CA band combination. The base station eNB determines that the user apparatus UE supports all of the "A" through "F" CA bandwidthclasses in the certain band.

Next, if a user apparatus UE supports a certain highest CA band combination and does not support some of its fallback band combinations, the user apparatus UE reports CA band combination information including information indicating the highest CA band combination as well as information indicating the (incompatible) fallback band combinations that are not supported to the base station eNB.

If the base station eNB receives, from the user apparatus UE, the CA band combination information including the "information indicating the highest CA band combination" and the "information indicating the incompatible fallback band combinations", the base station eNB determines that the user apparatus UE supports the received highest CA band combination as well as all of the fallback band combinations other than the incompatible fallback band combinations from among all of the fallback band combinations of the highest CA band combination.

Additionally, if the various parameters in some fallback band combinations are different from the various parameters in the highest CA band combination (that is, there is a difference in parameters from the highest CA band combination), the user apparatus UE reports CA band combination information including "information of fallback band combinations in which, among various parameters, only the parameters are configured that differ from those of the highest CA band combination." Note that the base station eNB which has received the "information of fallback band combinations in which, among various parameters, only the parameters are configured that differ from those of the highest CA band combination" determines that the parameters not reported in the fallback band combinations are the same as the parameters included in the highest CA band combination.

Additionally, a user apparatus UE may report the CA band combinations supported by the user apparatus UE itself in a manner of filtering the information by a plurality of bands indicated by the base station eNB. For example, if the base station eNB sends an instruction to a user apparatus UE to report only CA band combinations available using 800 M and 1.5 G, the user apparatus UE reports the highest CA band combination, the incompatible fallback band combinations, and the fallback band combinations having the parameter difference, from among the CA band combinations available using 800M and 1.5G.

The base station eNB which has received the CA band combination information then determines which of the CA combinations supported by the user apparatus UE is to be used, based on, for example, the communication quality of the user apparatus UE for each CC; and reports the determined CA combination to the user apparatus UE (configures the user apparatus UE), and so forth.

In order to carry out such an operation, the base station eNB holds a table (for example, FIG. 6) including, for example, for each highest CA band combination, the CA band combination and its fallback band combinations. At this time, the highest CA band combination and its fallback band combinations are determined uniquely between a user apparatus UE and a base station eNB. For example, the fallback band combinations (Nos. 2-19) of the highest CA combination No. 1 shown in FIG. 6 are determined uniquely in a radio communication system, and a base station eNB is aware of the fallback band combinations (Nos. 2-19) corresponding to the highest CA combination No. 1.

FIGS. 8 and 9 show an example of formats of CA band combination information studied in Rel. 13. As shown in FIGS. 8 and 9, "information indicating the highest CA band combination" may also be called "BandCombinationParametersParent". Additionally, "information indicating the incompatible fallback band combinations" may be called "non-SupportedBandCombinationChild". Additionally, "information of fallback band combinations in which, among various parameters, only the parameters are configured that differ from those of the highest CA band combination" may be called "supportedBandCombinationChildExt". FIG. 10 describes a processing procedure to generate CA band combination information examined in Rel. 13.

The CA band combination information studied in Rel. 13 is described above. The CA band combination information studied in Rel. 13 includes at least "information indicating the highest CA band combination". Additionally, depending on the capability of the user apparatus UE, "information indicating the incompatible fallback band combination" or/and "information of fallback band combinations in which, among various parameters, only the parameters are configured that differ from those of the highest CA band combination" are included.

<Overall System Configuration>

Figure 11:
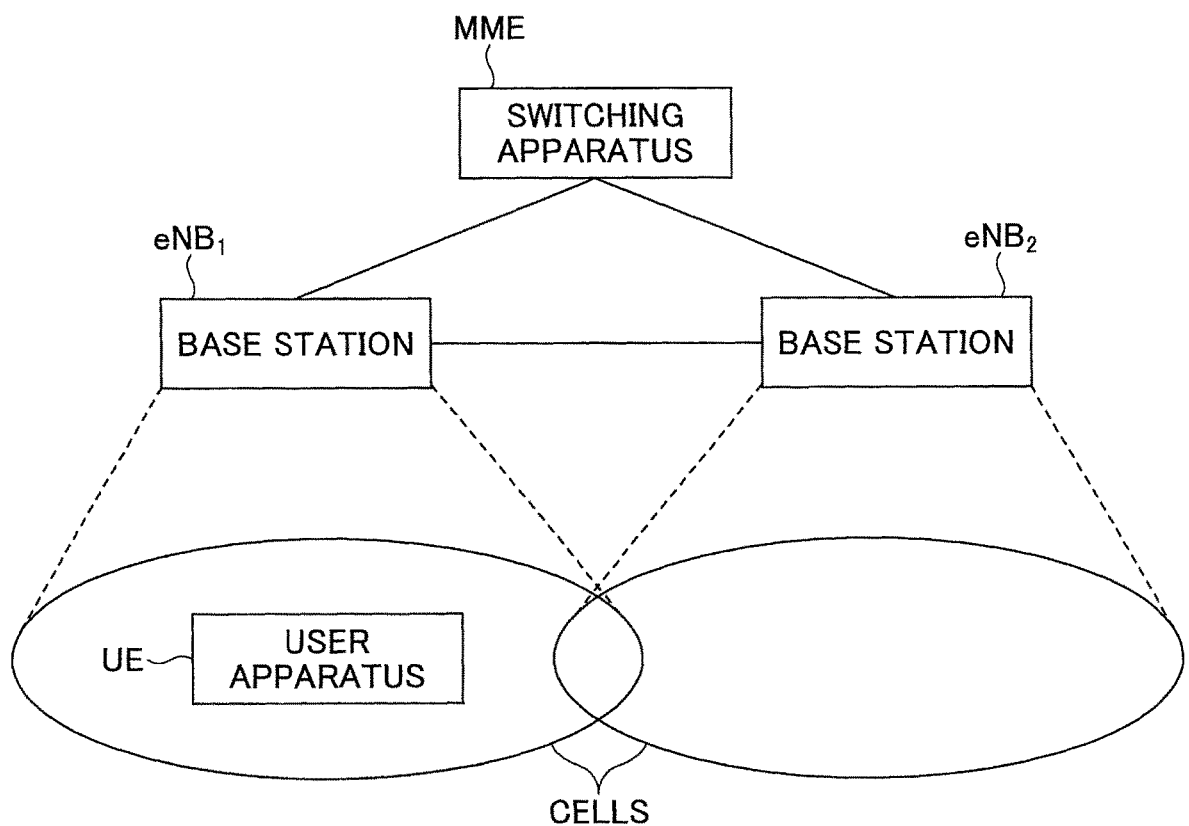
FIG. 11 shows a configuration example of a radio communication system according to an embodiment.

FIG. 11 shows a configuration example of a radio communication system according to the embodiment. The radio communication system according to the embodiment includes a user apparatus UE, a base station $eNB_1$, a base station $eNB_2$, and a switching apparatus MME. In FIG. 11, the single user apparatus UE is shown. However, this is an example, and a plurality of the user apparatuses UE may be included. Below, when the base stations $eNB_1$ and $eNB_2$ are not distinguished, they are described as "base stations eNB".

The user apparatus UE and the base stations eNB can carry out CA. Additionally, the user apparatus UE may have a capability (DC) of carrying out communication with the plurality of the base stations eNB simultaneously.

The base stations $eNB_1$ and $eNB_2$ are connected via a X2 interface, and can transmit and receive information mutually using a X2AP (X2 application protocol). The switching apparatus MME is connected with the base stations $eNB_1$ and $eNB_2$ via a S1 interface, and can transmit and receive information mutually using a S1AP (S1 application protocol).

According to the embodiment, if a base station eNB receives, from the user apparatus UE, CA band combination information (hereinafter, referred to as "new CA band combination information") generated in a format studied in Rel. 13, the base station eNB generates CA band combination information (hereinafter, referred to as "conventional CA band combination information") generated in a format prescribed in Rel. 10 from the plurality of CA band combinations indicated by the new CA band combination information, and transmits the conventional CA band combination information to the switching apparatus MME and another base station eNB as a target. Note that, in order to reduce the signal amount for transmitting the conventional CA band combination information, the base station eNB may select at least one or more CA band combinations from among the plurality of CA band combinations indicated by the new CA band combination information, and generate the conventional CA band combination info/Ration that indicates the selected CA band combinations.

The 3GPP specifications do not specify how another base station eNB operates if the other base station eNB is incapable of interpreting the new CA band combination information and does not receive the conventional CA band combination information. For example, the other base station eNB as a target may operate to receive CA band combination information from the user apparatus UE, or the other base station may interpret that the user apparatus UE does not support CA. In the first case, signaling messages may increase. In the second case, CA control may not be executed.

Accordingly, in the embodiment, the other base station eNB as a target is caused to be aware of the CA band combinations supported by the user apparatus even if the other base station eNB is incapable of interpreting the new CA band combination information, by transmitting the conventional CA band combination information to the switching apparatus MME and the other base station eNB.

<Hardware Configuration>
(Base Station)

Figure 12:
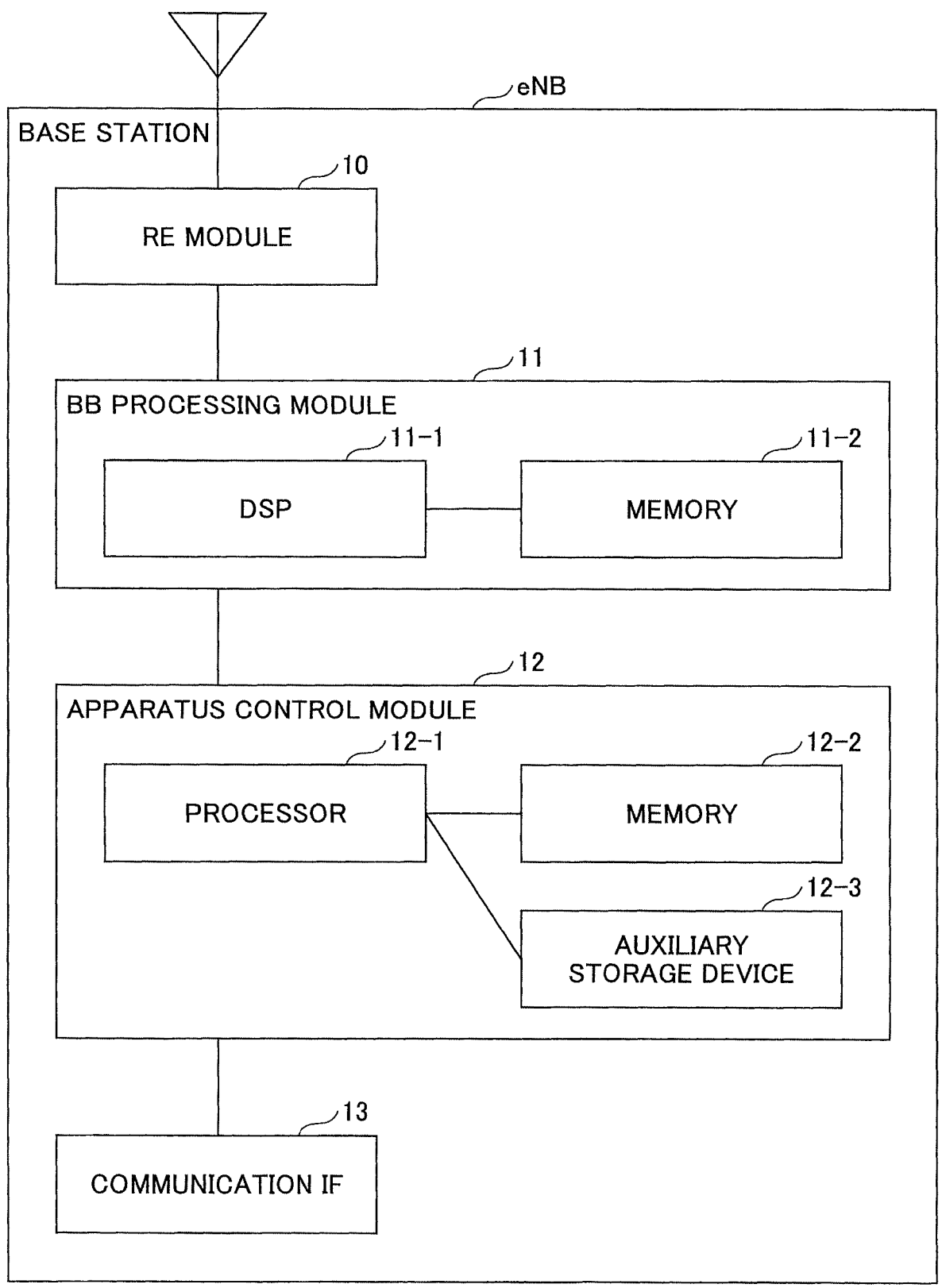
FIG. 12 shows one example of a hardware configuration of a base station according to the embodiment.

FIG. 12 shows one example of a hardware configuration of the base stations according to the embodiment. As shown in FIG. 12, each base station includes a RE (Radio Equipment) module 10 carrying out processing concerning a radio signal, a BB (Base Band) processing module 11 carrying out baseband signal processing, an apparatus control module 12 carrying out processing of a higher layer and so forth, and a communication IF (Interface) 13 that is an interface for connecting to a network.

The RE module 10 carries out D/A (Digital-to-Analog) conversion, modulation, frequency conversion, power amplification, and so forth, on a digital baseband signal received from the BB processing module 11, to generate a radio signal to be transmitted from an antenna. Additionally, The RE module 10 carries out frequency conversion, A/D (Analog to Digital) conversion, modulation, and so forth on a received radio signal, to generate a digital baseband signal, and sends the digital baseband signal to the BB processing module 11.

The BB processing module 11 carries out processing of mutually converting an IP packet and the digital baseband signal. A DSP (Digital Signal Processor) 11-1 carries out signal processing in the BB processing module 11. A memory 11-2 is used as a work area of the DSP 11-1.

The apparatus control module 12 carries out IP layer protocol processing, OAM (Operation and Maintenance) processing, and so forth. A processor 12-1 carries out processing carried out by the apparatus control module 12. A memory 12-2 is used as a work area of the processor 12-1. An auxiliary storage device 12-3 is, for example, an HDD, or the like, and stores various sorts of setting information for the base station eNB itself to operate.

(Switching Apparatus)

Figure 13:
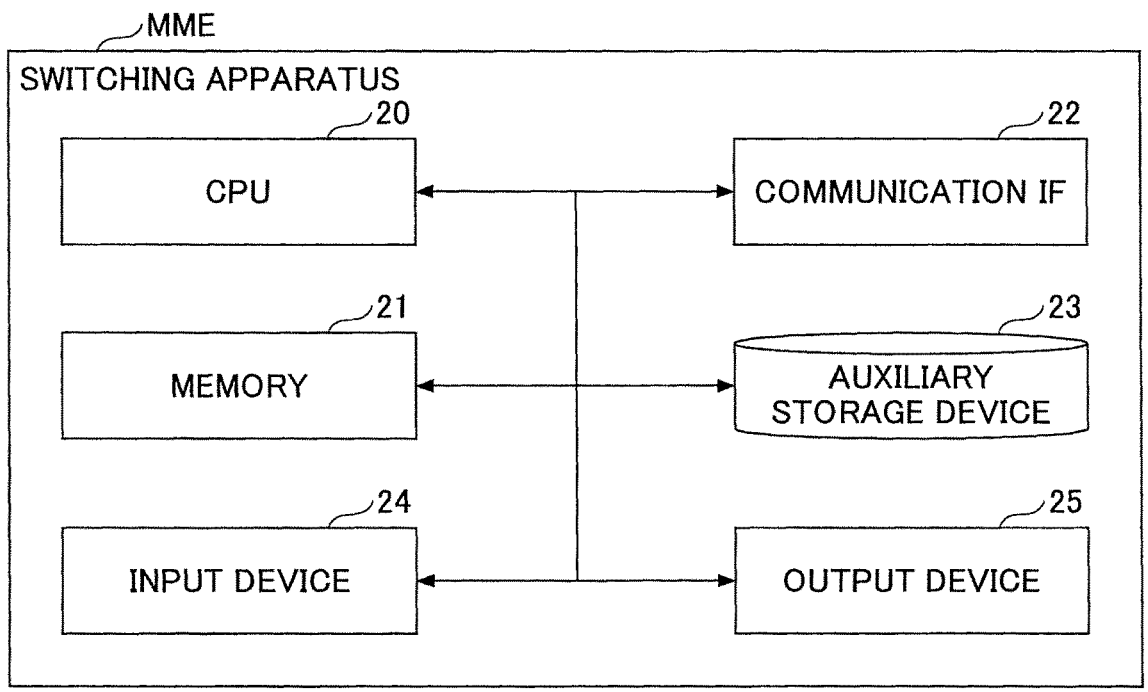
FIG. 13 shows one example of a hardware configuration of a switching apparatus according to the embodiment.

FIG. 13 shows one example of a hardware configuration of the switching apparatus according to the embodiment. As shown in FIG. 13, the switching apparatus MME includes a CPU (Central Processing Unit) 20 controlling the entirety of the switching apparatus MME, a memory 21 used as a work area of the CPU 20, a communication IF 22 carrying out communication with the base stations eNB and another switching apparatus, an auxiliary storage device 23 storing various sorts of data used by the switching apparatus MME and programs for the switching apparatus MME to operate, an input device 24 such as a keyboard, and an output device 25 displaying various sorts of information.

<Functional Configuration>
(Base Station)

Figure 14:
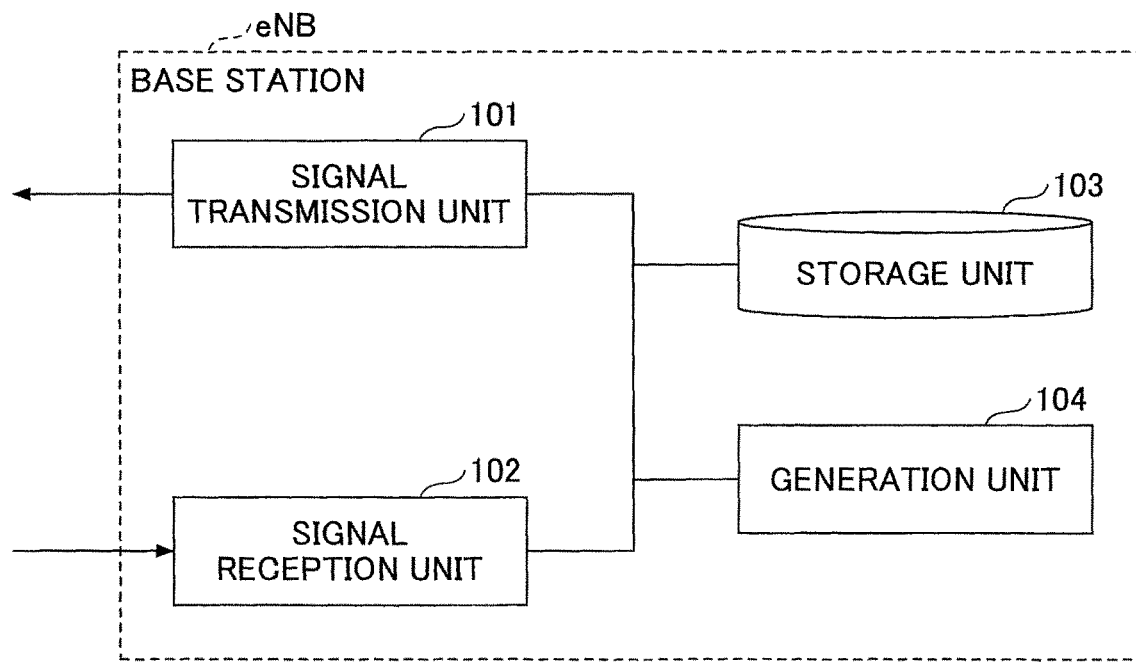
FIG. 14 shows one example of a functional configuration of the base station according to the embodiment.

FIG. 14 shows one example of a functional configuration of the base stations according to the embodiment. As shown in FIG. 14, each base station eNB includes a signal transmission unit 101, a signal reception unit 102, a storage unit 103, and a generation unit 104. Note that, FIG. 14 shows only functional units in particular concerning the embodiment of the present invention in the base station eNB, and the base station eNB also includes at least functions, which are not depicted, of carrying out operations according to LTE. The functional configuration shown in FIG. 14 is merely one example. As long as the operations concerning the embodiment can be carried out, the classifications of the functions and the names of the functions can be any other classifications and functions. Each unit can be implemented as a result of one or more programs installed in the base station eNB being executed by the DSP 1-1 or the processor 12-1.

The signal transmission unit 101 includes a function for generating various signals of a physical layer from signals of higher layers to be transmitted from the base station eNB, and for wirelessly transmitting the signals. The signal transmission unit 101 further has a function of, using the X2 interface and the S1 interface, transmitting various signals to the other base station eNB and the switching apparatus MME. Additionally, the signal transmission unit 101 has a function of transmitting the CA band combination information generated by the generation unit 104 to the other base station eNB or the switching apparatus MME.

The signal reception unit 102 has a function of receiving various radio signals from the user apparatus UE, and retrieving signals of the upper layers from the received signals of the physical layer. Additionally, the signal reception unit 102 has a function of, using the X2 interface and the S1 interface, receiving various signals from the other base station eNB and the switching apparatus MME. Additionally, the signal reception unit 102 has a function of receiving the CA band combination information from the user apparatus UE, the other base station eNB or the switching apparatus MME.

The storage unit 103 has a function of storing the CA band combination information received from the user apparatus UE. Additionally, the storage unit 103 has a function of storing the CA band combination information received from the other base station eNB and the switching apparatus MME.

The generation unit 104 has a function of generating the CA band combination information according to the format specified in Rel. 10. Note that, the generation unit 104 may select at least one or more CA band combinations from among the CA band combinations indicated by the CA band combination information stored in the storage unit 103, and generate the CA band combination information according to the format specified in Rel. 10.

(Switching Apparatus)

Figure 15:
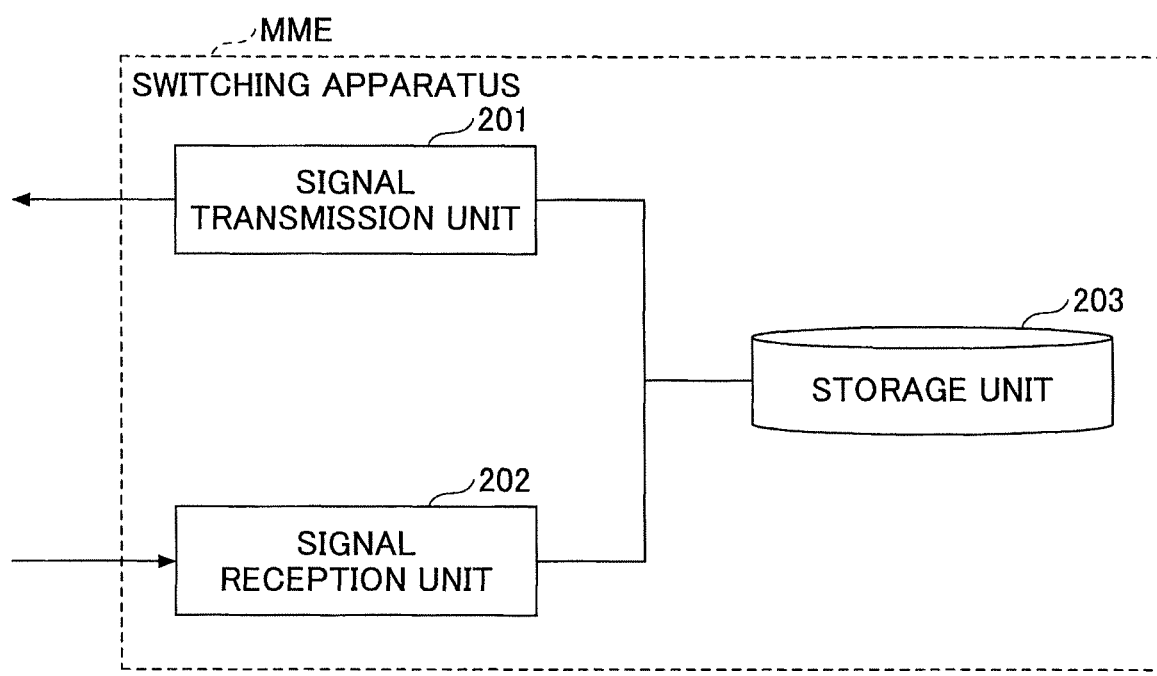
FIG. 15 shows one example of a functional configuration of the switching apparatus according to the embodiment.

FIG. 15 illustrates one example of a functional configuration of the switching apparatus according to the embodiment. As shown in FIG. 15, the switching apparatus MME includes a signal transmission unit 201, a signal reception unit 202, and a storage unit 203. Note that, FIG. 15 shows only functional units in particular concerning the embodiment of the present invention in the switching apparatus MME, and the switching apparatus MME also includes at least functions, which are not depicted, of carrying out operations according to LTE. The functional configuration shown in FIG. 15 is merely one example. As long as the operations concerning the embodiment can be carried out, the classifications of the functions and the names of the functions can be any other classifications and functions. Each unit can be implemented as a result of one or more programs installed in the switching apparatus MME being executed by the CPU 20.

The signal transmission unit 201 has a function of using the S1 interface to transmit various signals to the base stations eNB. Additionally, the signal transmission unit 201 has a function of transmitting the CA band combination information stored in the storage unit 203 to the base stations eNB.

The signal reception unit 202 has a function of using the S1 interface to receive various signals from the base stations eNB. Additionally, signal reception unit 102 has a function to receive the CA band combination information from the base stations eNB to store the CA band combination information in the storage unit 203.

The storage unit 203 has a function of storing CA band combination information received from the base station eNB.

<Processing Procedure>

(Processing Sequence)

Figure 16:
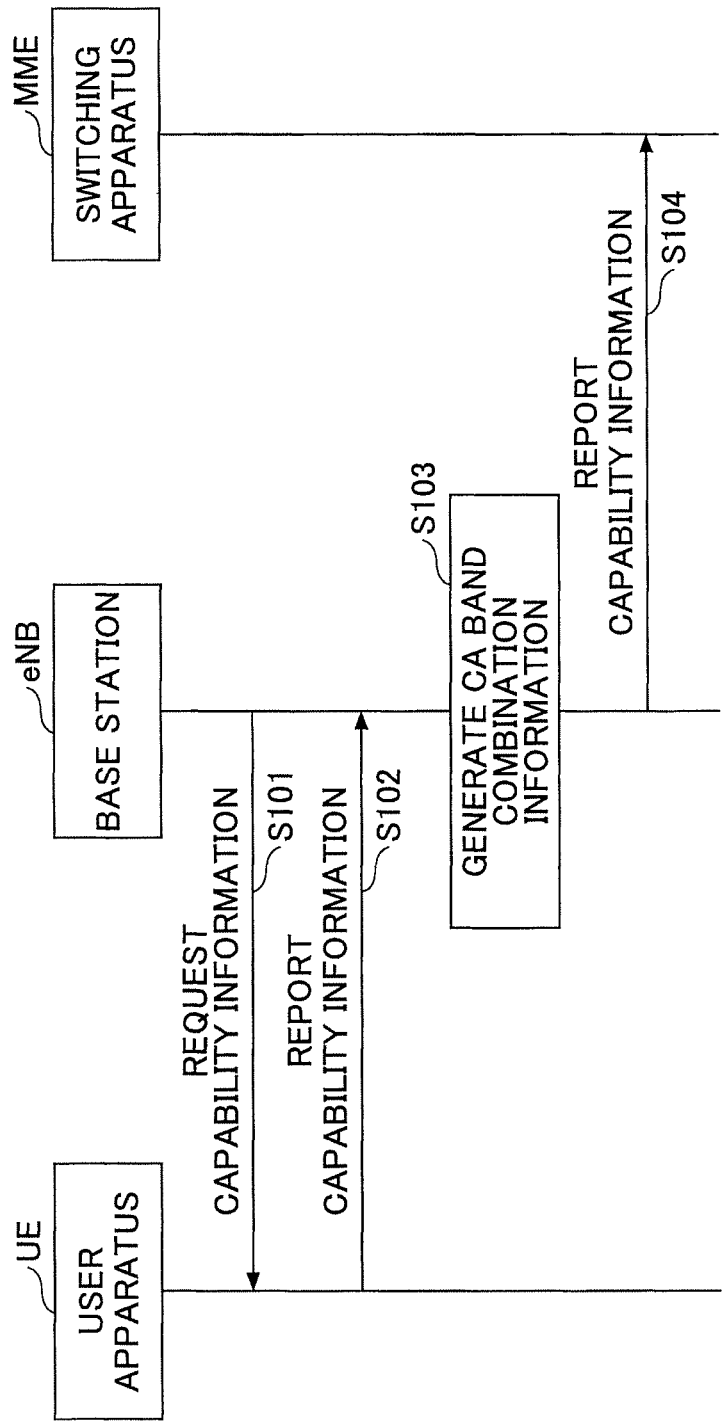
FIG. 16 is a sequence diagram showing a processing procedure carried out by the radio communication system according to the embodiment.

FIG. 16 is a sequence diagram showing a processing procedure carried out by the radio communication system according to the embodiment. Using FIG. 16, a processing procedure is described such that a base station eNB generates conventional CA band combination information based on new CA band combination information received from the user apparatus UE, and transmits the conventional CA band combination information to the switching apparatus MME. Note that the processing procedure shown in FIG. 16 is a processing procedure that is carried out when the base station eNB receives the capability (UE Capability) of the user apparatus UE, and is started, for example, at a time of attaching.

In step S101, the signal transmission unit 101 of the base station eNB transmits a capability information request signal to the user apparatus UE. The capability information request signal may be, for example, a "UECapabilityEnquiry message". Note that, if the base station eNB itself supports new CA band combination information, the signal transmission unit 101 includes, in the capability information request signal, information indicating to request new CA band combination information. This information may be called, for example, an "enhancedCapabilityRequest". Note that, the signal transmission unit 101 of the base station eNB may include information indicating a plurality of bands supported by the base station eNB in the capability information request signal. The information indicating a plurality of bands supported by the base station eNB is called, for example, a "requestedFrequencyBands".

In step S102, the user apparatus UE transmits a capability reporting signal that includes new CA band combination information to the base station eNB. The capability reporting signal may be, for example, a "UECapabilityInformation message". The signal reception unit 102 of the base station eNB stores the received new CA band combination information included in the capability reporting signal in the storage unit 103.

In step S103, the generation unit 104 of the base station eNB generates conventional CA band combination information from the new CA band combination stored in the storage unit 103. At this time, the generation unit 104 may select at least one or more CA band combinations from among all of the CA band combinations supported by the user apparatus UE indicated by the new CA band combination information stored in the storage unit 103, and generates the conventional CA band combination information. The specific generation method is described below.

In step S104, the signal transmission unit 101 of the base station eNB transmits a capability reporting signal including the conventional CA band combination information generated by the generation unit 104 to the switching apparatus MME. Note that, the capability reporting signal may be, for example, an "UE Capability Info Indication message" specified in S1AP. The signal reception unit 202 of the switching apparatus MME stores the conventional CA band combination information included in the received capability reporting signal in the storage unit 203.

Note that, in step S104, the signal transmission unit 101 of the base station eNB may transmit the capability reporting signal including both the conventional CA band combination information generated by the generation unit 104 and the new CA band combination information received in step S102 to the switching apparatus MME. The signal reception unit 202 of the switching apparatus MME stores the conventional CA band combination information and the new CA band combination information included in the received capability reporting signal in the storage unit 203.

Figure 17:
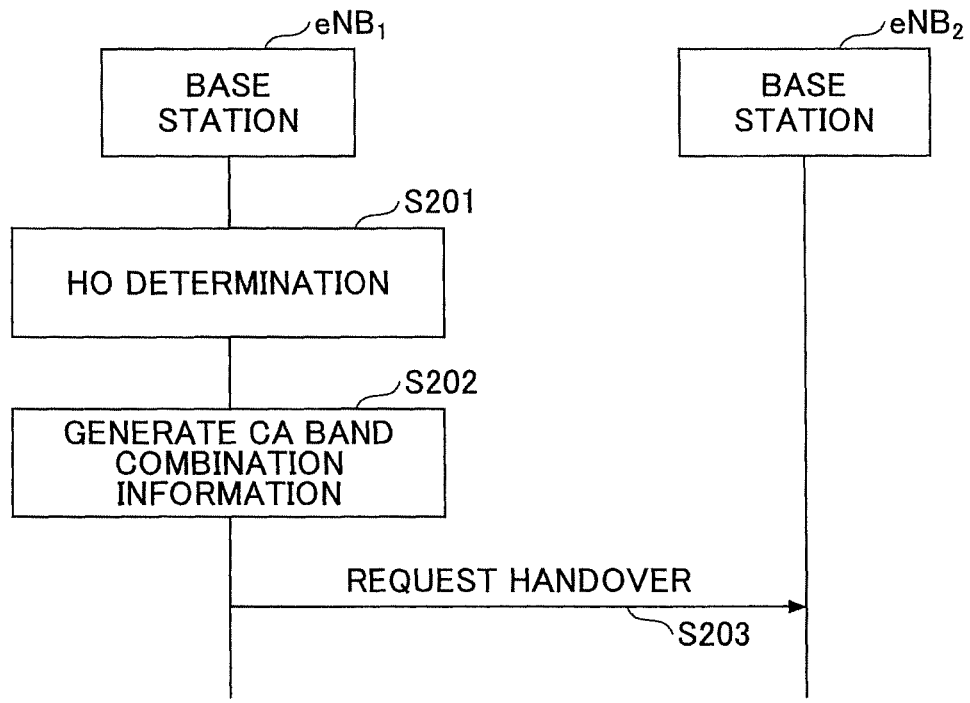
FIG. 17 is a sequence diagram showing a processing procedure carried out by the radio communication system according to the embodiment.

FIG. 17 is a sequence diagram showing a processing procedure carried out by the radio communication system in the embodiment. Using FIG. 17, a processing procedure is described, which is for the base station eNB$_1$ to generate conventional CA band combination information based on new CA band combination received from the user apparatus UE and to transmit the conventional CA band combination information to another base station eNB$_2$. Note that, the processing procedure shown in FIG. 17 is a processing procedure carried out when, for example, the user apparatus UE in a RRC Connected state carries out handover processing. Here, it is assumed that, before the sequence shown in FIG. 17 is carried out, the procedures of steps S101 and S102 of FIG. 16 are carried out, and the new CA band combination information is stored in the storage unit 103 of the base station eNB$_1$.

In step S201, the base station eNB$_1$ determines to cause the user apparatus UE to execute handover to the base station eNB$_2$ based on reception quality information (Measurement Report) received from the user apparatus UE.

In step S202, the generation unit 104 of the base station eNB$_1$ generates conventional CA band combination information from the new CA band combination stored in the storage unit 103. At this time, the generation unit 104 may select at least one or more CA band combinations from among all of the CA band combinations supported by the user apparatus UE indicated by the new CA band combination information stored in the storage unit 103, and generate the conventional CA band combination information. The specific generation method is described below.

In step S203, the signal transmission unit 101 of the base station eNB$_1$ transmits a handover request signal including the conventional CA band combination information generated by the generation unit 104 to the base station eNB$_2$. Note that, the handover request signal may be, for example, a "Handover Request message" prescribed in X2AP. The signal reception unit 102 of the base station eNB$_2$ stores the conventional CA band combination information included in the received handover request signal in the storage unit 103.

Note that, in step S203, the signal transmission unit 101 of the base station eNB$_1$ may transmit, to the base station eNB$_2$, the handover request signal including both the conventional CA band combination information generated by the generation unit 104 and the new CA band combination information stored in the storage unit 103. The signal reception unit 102 of the base station eNB$_2$ stores, in the storage unit 103, the conventional CA band combination information and the new CA band combination information included in the received handover request signal. Note that, if the base station eNB$_2$ does not support the new CA band combination information, the base station eNB$_2$ is incapable of interpreting the new CA band combination information, and stores only the conventional CA band combination information in the storage unit 103.

Additionally, if the signal transmission unit 101 of the base station eNB$_1$ is previously aware that the base station eNB$_2$ supports the new CA band combination information, the signal transmission unit 101 of the base station eNB$_1$ may transmit only the new CA band combination information to the base station eNB$_2$ in step S203. In the same way, if the signal transmission unit 101 of the base station eNB$_1$ is previously aware that the base station eNB$_2$ supports only the conventional CA band combination information, the signal transmission unit 101 of the base station eNB$_1$ may transmit only the conventional CA band combination information to the base station eNB$_2$ in step S203.

Figure 18:
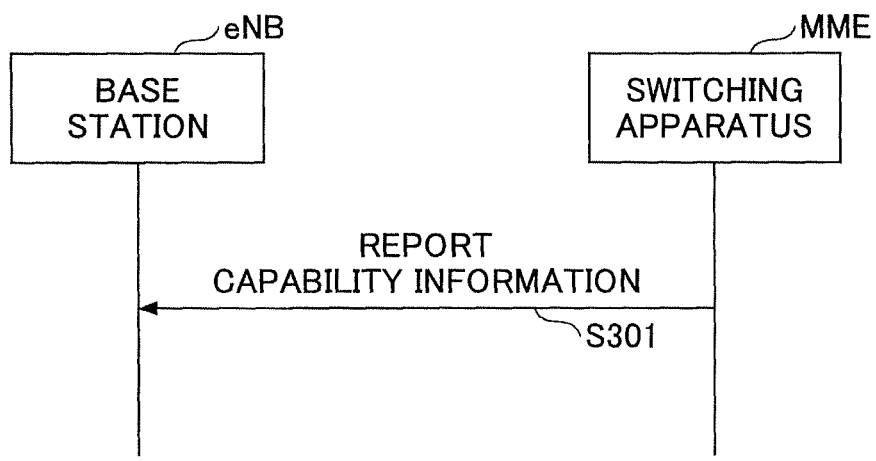
FIG. 18 is a sequence diagram showing a processing procedure carried out by the radio communication system according to the embodiment.

FIG. 18 is a sequence diagram showing a processing procedure carried out by the radio communication system according to the embodiment. The sequence shown in FIG. 18 is carried out if it is necessary to report the capability information of the user apparatus UE from the switching apparatus MME to the base station eNB, such as a case in which the user apparatus UE in the RRC Idle attempts to connect to the base station eNB, which is the destination to move, so as to transition to the RRC Connected state; or a case in which handover is executed across the switching apparatus MME. Here, it is assumed that, prior to execution of the sequence illustrated in FIG. 18, the procedure of step S104 of FIG. 16 is carried out, and CA band combination information (conventional CA band combination information, or conventional CA band combination information and new CA band combination information) is stored in the storage unit 203 of the switching apparatus MME.

In step S301, the signal transmission unit 201 of the switching apparatus MME transmits, to the base station eNB, a capability reporting signal including the CA band combination information (conventional CA band combination information, or conventional CA band combination information and new CA band combination information) stored in the storage unit 203. The capability reporting signal may be, for example, "INITIAL CONTEXT SETUP REQUEST message" specified in S1AP. The signal reception unit 102 of the base station eNB stores the CA band combination information included in the received capability reporting signal in the storage unit 103. Note that, if the base station eNB does not support the new CA band combination information, the base station eNB is incapable of interpreting the new CA band combination information, and stores only the conventional CA band combination information in the storage unit 103.

(Method of Generating Conventional CA Band Combination Information)

Next, specific examples of the procedure of step S103 of FIG. 16 and the procedure of step S202 of FIG. 17 are described.

[Generation Method 1]

The generation unit 104 selects all of the CA band combinations corresponding to 2DL/1UL CA band combinations from among all of the CA band combinations supported by the user apparatus UE, and generates CA band combination information. For example, if all of the CA band combinations supported by the user apparatus UE are the CA band combinations shown in FIG. 6, the generation unit 104 attempts to include the CA band combinations No. 11 through No. 16 in the conventional CA band combination information.

[Generation Method 2]

The generation unit 104 selects, among all of the CA band combinations supported by the user apparatus UE, all of the CA band combinations corresponding to the 2DL/1UL CA band combinations in the frequency bands supported by the entire ratio communication network, so as to generate CA band combination information. For example, if all of the CA band combinations supported by the user apparatus UE are the CA band combinations shown in FIG. 6, and the frequency bands supported by the entire ratio communication network is 800 M (19A) and 2 G (1A), the generation unit 104 attempts to include the CA band combinations No. 15 and No. 16 in conventional CA band combination information. Here, in order to cause the generation unit 104 to be aware of the frequency bands supported by the entire ratio communication network, information indicating the frequency bands supported by the entire ratio communication network may be previously stored in the storage unit 103, etc.

[Generation Method 3]

The generation unit 104 selects, among all of the CA band combinations supported by the user apparatus UE, all of the CA band combinations corresponding to all of the 2DL/1UL CA band combinations in the frequency bands supported by the base station eNB that transmits a handover request, so as to generate CA band combination information. For example, if all of the CA band combinations supported by the user apparatus UE are the CA band combinations shown in FIG. 6, and the frequency bands supported by the base station eNB that transmits the handover request are 1.5 G (21A) and 2 G (1A), the generation unit 104 attempts to include the CA band combinations No. 13 and No. 14 in conventional CA band combination information. Note that, in order to cause the generation unit 104 to be aware of the frequency bands supported by the base station eNB that transmits the handover request, information indicating the frequency bands respectively supported by all the base stations eNB that exist in the ratio communication network may be previously stored in the storage unit 103, etc.

[Generation Method 4]

The generation unit 104 selects, among all of the CA band combinations supported by the user apparatus UE, at least one 2DL/1UL CA band combination in the frequency bands supported by the entire ratio communication network, so as to generate the CA band combination information. For example, if all of the CA band combinations supported by the user apparatus UE are the CA band combinations shown in FIG. 6, and the frequency bands supported by the entire ratio communication network are 800 M (19A) and 2 G (1A), the generation unit 104 attempts to include at least one of the CA band combinations No. 15 and No. 16 in conventional CA band combination information.

[Generation Method 5]

The generation unit 104 selects, among all of the CA band combinations supported by the user apparatus UE, at least one 2DL/1UL CA band combination in the frequency bands supported by the base station eNB that transmits the handover request, so as to generate CA band combination information. For example, if all of the CA band combinations supported by the user apparatus UE are the CA band combinations shown in FIG. 6, and the frequency bands supported by the base station eNB that transmits the handover request are 1.5 G (21A) and 2 G (1A), the generation unit 104 attempts to include at least one of the CA band combinations No. 13 and No. 14 in conventional CA band combination information.

[Generation Method 6]

The generation unit 104 selects, among all of the CA band combinations supported by the user apparatus UE, all of the CA band combinations corresponding to the Non-CA CA band combinations, so as to generate the CA band combination information. For example, if all of the CA band combinations supported by the user apparatus UE are the CA band combinations shown in FIG. 6, the generation unit 104 attempts to include the CA band combinations No. 17 through No. 19 in the conventional CA band combination information.

Note that, the generation unit 104 may combine the generation method 6 and any one of the generation methods 1 through 5. For example, the generation unit 104 may combine the generation method 1 and the generation method 6, or may combine the generation method 2 and the generation method 6, or may combine the generation method 3 and the generation method 6, or may combine the generation method 4 and the generation method 6, or may combine the generation method 5 and the generation method 6. If the generation method 1 and the generation method 6 are combined, the generation unit 104 includes the CA band combinations No. 11 through No. 19 of FIG. 6 in conventional CA band combination information.

[Generation Method 7]

The generation unit 104 attempts to include all of the CA band combinations supported by the user apparatus UE in the conventional CA band combination information. For example, if all of the CA band combinations supported by the user apparatus UE are the CA band combinations shown in FIG. 6, the generation unit 104 attempts to include all of the CA band combinations No. 1 through No. 19 in the conventional CA band combination information.

[Generation Method 8]

The generation unit 104 selects, among all of the CA band combinations supported by the user apparatus UE, all of the CA band combinations corresponding to the 5DL/5UL CA band combinations and their fallback band combinations, so as to generate the CA band combination information.

The generation methods 1 through 8 are described above. However, the generation unit 104 may combine two or more of the generation methods 1 through 8, without being limited to the combinations described in the generation method 6.

CONCLUSION

According to the above-described embodiment, there is provided a base station of a radio communication system supporting carrier aggregation, the base station including a receiver configured to receive, from a user apparatus, first band combination information that indicates combinations of bands that are capable of being supported by the user apparatus through the carrier aggregation, the first band combination information being generated in a first format; a generator configured to generate, based on the combinations of bands indicated by the first band combination information, second band combination information using a second format; and a transmitter configured to transmit, to another base station or a switching apparatus, the second band combination information generated by the generator. The base station eNB provides a technology making it possible to cause each base station to be aware of the CA band combinations supported by the user apparatus.

Further, the transmitter may be configured to transmit, to the other base station or the switching apparatus, the first band combination information and the second band combination information. As a result, it is possible to omit processing of the other base station eNB to obtain the new CA band combination information from the user apparatus UE, if the other base station eNB that is a target of HO, etc., is capable of interpreting the new CA band combination information.

Further, the generator may be configured to select, from the combinations of bands indicated by the first band combination information, one or more band combinations, and configured to generate the second band combination information indicating the selected one or more band combinations using the second format. As a result, the information amount of the conventional CA band combination information is reduced, and it is possible to reduce the signal amount of a signaling message.

Further, the first band combination information may be any one of: information including highest band combination information indicating a highest band combination with a largest number of CCs combined; information including the highest band combination information indicating the highest band combination with the largest number of CCs combined and incompatible band combination information indicating incompatible band combinations not supported by the user apparatus; information including the highest band combination information indicating the highest band combination with the largest number of CCs combined, the incompatible band combination information indicating the incompatible band combinations not supported by the user apparatus, and information including exceptional band combination information indicating band combinations including parameters different from parameters corresponding to the highest band combination; and information including the highest band combination information indicating the highest band combination with the largest number of CCs combined and the information including the exceptional band combination information indicating band combinations including parameters different from parameters corresponding to the highest band combination. As a result, it is possible to express various CA band combinations, while reducing the information amount of the new CA band combination information.

Further, the first band combination information may be SupportedBandCombination-r13, and the second band combination information may be SupportedBandCombination-r10. As a result, it is possible to provide a technology making it possible to cause each base station to be aware of the CA band combinations that can be supported by the user apparatus Furthermore, according to the embodiments, there is provided a reporting method carried out by a base station of a radio communication system supporting carrier aggregation, the reporting method including a reception step of receiving, from a user apparatus, first band combination information that indicates combinations of bands supported by the user apparatus through the carrier aggregation, the first band combination information being generated in a first format; a generation step of generating, based on the combinations of bands indicated by the first band combination information, second band combination information using a second format; and a transmission step of transmitting, to another base station or a switching apparatus, the second band combination information generated in the generation step. By the reporting method, a technology can be provided that causes each base station to be aware of the CA band combinations that can be supported by the user apparatus.

Additional Embodiments

The format of the CA band combination information studied in Rel. 13 described in the embodiments is merely one example, and the embodiments can be applied irrespective of the format described in the embodiments.

Concerning the method claim, the various step elements are shown in the order of a sampling manner. Unless otherwise specified in the claim, the method is not limited to the stated specific order.

The configuration of each of the respective apparatuses (the user apparatus UE, the base stations eNB, and the switching apparatus MME) described above concerning the embodiments may be implemented as a result of, in the apparatus including a CPU and a memory, the CPU executing a program; may be implemented by hardware such as hardware circuits including processing logics described above concerning the embodiments; or may be implemented by a mixture of a program and hardware.

The embodiments of the present invention have been described. However, the disclosed invention is not limited to the embodiments, and the person skilled in the art will understand various variants, modified examples, alternative examples, replacement examples, and so forth. Although the description has been made using specific numeral values, these numerical values are merely examples and any other suitable values may be used unless otherwise specified. The classifications of items in the above description are not essential to the present invention, two or more classified items may be used after being combined together as appropriate, or a matter described in one item may be applied to a matter described in another item (unless causing contradiction). The boundaries of the functional units or processing units in the functional block diagrams do not necessarily correspond to the physical boundaries of components. A plurality of functional units may be implemented by a physically single component, or operation of a single functional unit may be carried out by physically plurality of components. The orders in the sequences and the flowcharts described above concerning the embodiments may be changed unless causing contradiction. Although the user apparatus UE, the base stations eNB and the switching apparatus MME are described using the functional block diagrams for the sake of convenience in describing the processing, these apparatuses may be implemented by hardware, software, or a mixture thereof. Each of the software operated by a processor included in the user apparatus UE according to the embodiments of the present invention, the software executed by a processor included in the base station eNB according to the embodiments of the present invention, and the software executed by a processor included in the switching apparatus MME according to the embodiments of the present invention may be stored in any suitable recording medium, such as a random access memory (RAM), a flash memory, a read-only memory (ROM), an EPROM, an EEPROM, a register, a hard disk (HDD), a removable disk, a CD-ROM, a database, a server, and so forth.

Note that, in the embodiments, the format studied in Rel. 13 is one example of the first format. The format specified in Rel. 10 is one example of the second format. The new CA band combination information is one example of the first band combination information. The conventional CA band combination information is one example of the second band combination information. "CA band combination information" is one example of the band combination information. "Information indicating the highest CA band combination" is one example of the highest band combination information. "Information indicating the incompatible fallback band combinations" is one example of the incompatible band combination information. "Information of fallback band combinations in which, among various parameters, only the parameters are configured that differ from those of the highest CA band combination" is one example of the exceptional band combination information.

The present patent application is based on and claims the priority of Japanese Patent Application No. 2015-187497 filed on Sep. 24, 2015. The entire contents of Japanese Patent Application No. 2015-187497 are incorporated herein.

DESCRIPTION OF REFERENCE SIGNS

UE user apparatus
eNB base station
MM switching apparatus
10 RE module
11 BB processing module
12 apparatus control module
13 communication IF
20 CPU
21 memory
22 communication IF
23 auxiliary storage device
24 input device 25 output device
101 signal transmission unit
102 signal reception unit
103 storage unit
104 generation unit
201 signal transmission unit
202 signal reception unit
203 storage unit

The invention claimed is:

1. A base station of a radio communication system supporting carrier aggregation, the base station comprising:
   a receiver configured to receive, from a user apparatus, first band combination information in a first format, the first band combination information indicating combinations of bands that are capable of being supported by the user apparatus through the carrier aggregation;
   a generator configured to generate second band combination information in a second format, the second format being different from the first format, the second band combination information indicating the combinations of bands indicated by the first band combination information; and
   a transmitter configured to transmit, to another base station or a switching apparatus, the second band combination information in the second format.

2. The base station according to claim 1, wherein the transmitter is configured to transmit, to the other base station or the switching apparatus, the first band combination information and the second band combination information.

3. The base station according to claim 1, wherein the generator is configured to select, from the combinations of bands indicated by the first band combination information, one or more band combinations, and configured to generate the second band combination information indicating the selected one or more band combinations using the second format.

4. The base station according to claim 1, wherein the first band combination information is any one of:
   information including highest band combination information indicating a highest band combination with a largest number of CCs combined;
   information including the highest band combination information indicating the highest band combination with the largest number of CCs combined and incompatible band combination information indicating incompatible band combinations not supported by the user apparatus;
   information including the highest band combination information indicating the highest band combination with the largest number of CCs combined, the incompatible band combination information indicating the incompatible band combinations not supported by the user apparatus, and information including exceptional band combination information indicating band combinations including parameters different from parameters corresponding to the highest band combination; and
   information including the highest band combination information indicating the highest band combination with the largest number of CCs combined and the information including the exceptional band combination information indicating band combinations including parameters different from parameters corresponding to the highest band combination.

5. A reporting method carried out by a base station of a radio communication system supporting carrier aggregation, the reporting method comprising:
   a reception step of receiving, from a user apparatus, first band combination information in a first format, the first band combination information indicating combinations of bands supported by the user apparatus through the carrier aggregation;
   a generation step of generating second band combination information in a second format, the second format being different from the first format, the second band combination information indicating the combinations of bands indicated by the first band combination information; and
   a transmission step of transmitting, to another base station or a switching apparatus, the second band combination information in the second format.

* * * * *